United States Patent [19]

Tsuji et al.

[11] Patent Number: 4,808,835
[45] Date of Patent: Feb. 28, 1989

[54] POWER GENERATION CASSETTE TYPE POWER PLANT FOR MARINE ELECTRIC PROPULSION AND A CONTROLLER THEREOF

[75] Inventors: Masanari Tsuji; Yuji Tani; Akira Zaitsu; Kojiro Shimamoto; Masaaki Hashii; Ikuo Donoue; Hiromi Suzuki; Yoshihito Sakakibara, all of Kobe, Japan

[73] Assignee: Mitsubishi Jukogyo Kabushiki Kaisha, Tokyo, Japan

[21] Appl. No.: 61,144

[22] Filed: Jun. 12, 1987

[30] Foreign Application Priority Data

Jul. 3, 1986 [JP] Japan .................. 61-102579[U]

[51] Int. Cl.$^4$ ................................ H02J 3/38
[52] U.S. Cl. ............................. 290/4 A; 290/2
[58] Field of Search ............. 290/2, 4 R, 4 A, 4 B, 290/30 R, 30 A, 30 B, 55

[56] References Cited

U.S. PATENT DOCUMENTS

| | | | |
|---|---|---|---|
| 2,655,602 | 10/1953 | Kuhn | 290/30 A |
| 3,047,724 | 7/1962 | Neufville et al. | 290/4 R |
| 4,275,311 | 1/1981 | Agazzone et al. | 290/2 |
| 4,503,337 | 3/1985 | Hafner et al. | 290/2 X |
| 4,527,071 | 7/1985 | Ausiello | 290/4 R |

OTHER PUBLICATIONS

"Marine Propulsion", Nov. 1986, p. 7.
"Motor Ship", Nov. 1986.
"Marine Engineers Review", Dec. 1986, p. 10.
"Diesel & Gas Turbine Worldwide", Mar. 1987, pp. 48-49.
"Marine Engineers Review", Feb. 1987, p. 30.

*Primary Examiner*—William M. Shoop, Jr.
*Assistant Examiner*—W. E. Duncanson, Jr.
*Attorney, Agent, or Firm*—Birch, Stewart, Kolasch & Birch

[57] ABSTRACT

A power generation cassette type power plant for marine electric propulsion includes a multiplicity of power generation units each being formed as a power generation cassette including a power generator, a prime mover, for example an internal combustion engine for driving the power generator and a support structure for supporting the power generator and the engine internally. The support structure is formed in the same shape as that of a container for transporting cargo. When the power generators of the multiplicity of power generation units are operated in parallel to each other to supply electric power to a load, controllers serve to share the load to the generators properly.

6 Claims, 6 Drawing Sheets

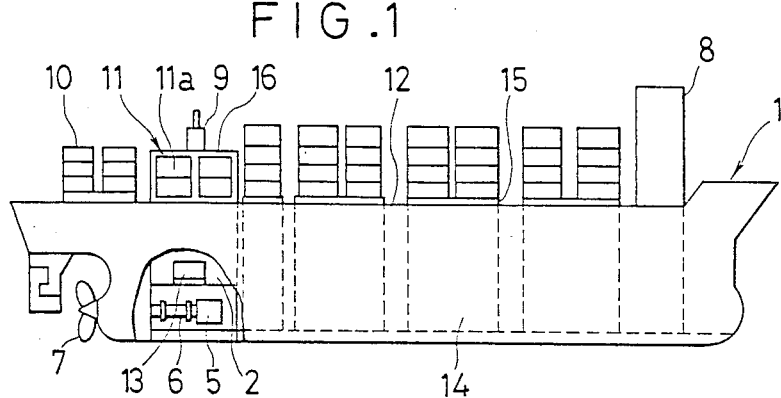
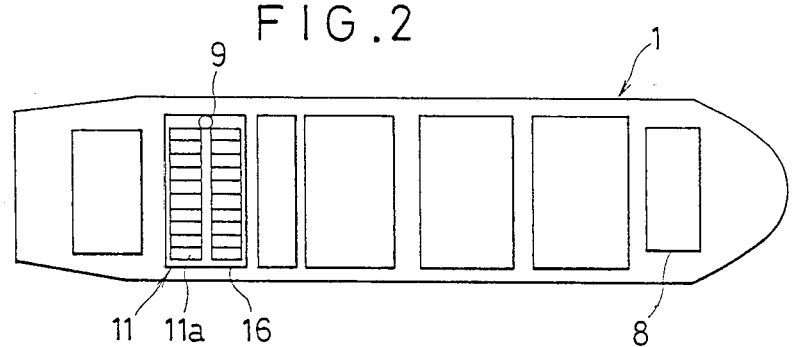
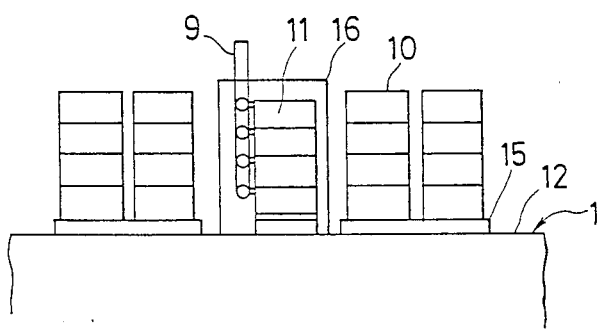

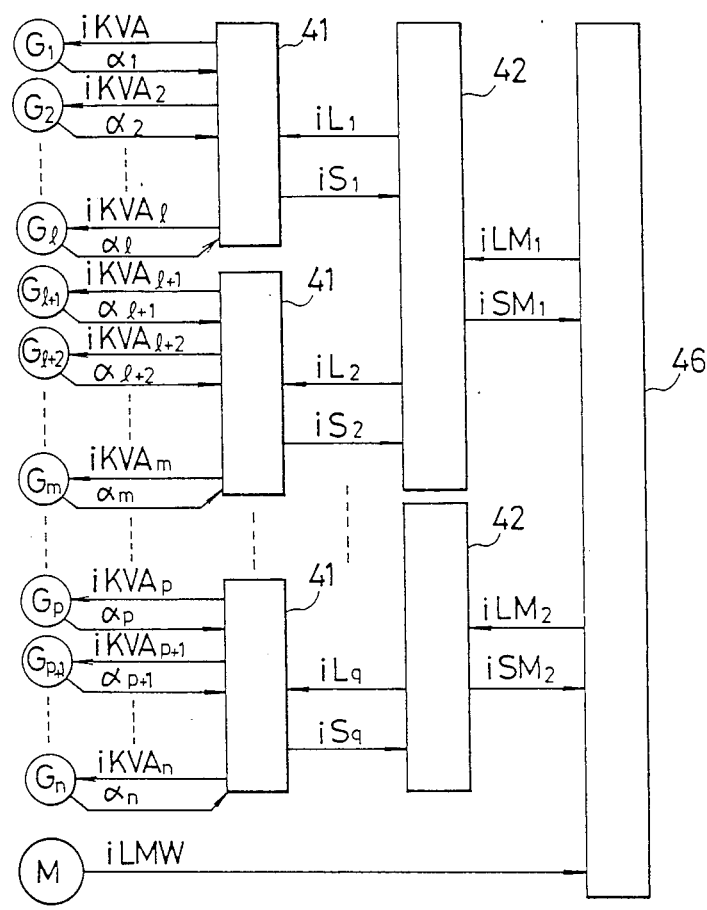
FIG. 8
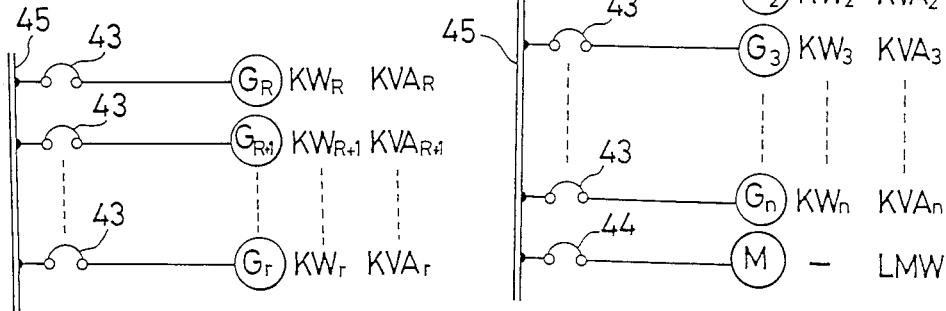
FIG. 10
FIG. 13 (PRIOR ART)

POWER GENERATION CASSETTE TYPE POWER PLANT FOR MARINE ELECTRIC PROPULSION AND A CONTROLLER THEREOF

FIELD OF THE INVENTION AND RELATED ART STATEMENT

The present invention relates to a power plant for marine electric propulsion and a controller thereof, and more particularly to a power generation cassette type power plant for marine electric propulsion suitable for use in propelling a container ship and a controller for sharing loads to power generators in the power plant for marine electric propulsion having such multiple power generation units.

A conventional power plant for marine electric propulsion includes an engine room 51 in a ship 1 as shown in FIG. 11. Several power generation units 4 are provided in an auxiliary machinery room or space 3 forming a part of the engine room 51. Electric power generated from the power generation units 4 is supplied to a main drive motor 5 to drive it. Rotary power of the main drive motor 5 is transmitted through a propeller shaft 6 to a propeller 7 to propel the ship 1.

The power generation unit 4 is generally a combined unit of a prime mover 4a such as an internal combustion engine and a generator 4b. Exhaust gas from the engine 4a is discharged outside of the ship from a funnel 52 provided on an upper deck 12. Generally, there are provided a small number of large power generation units 4.

In FIG. 11, numeral 10 denotes a cargo container, numeral 14 denotes a container holder and numeral 15 denotes a hatch cover.

However, the conventional ship requires large space for the auxiliary machinery room or space 3 dedicated to the power generation units 4 and accordingly space for guest rooms or cargoes is limited. Particularly, the limitation in a ship requiring large power is extremely large.

Maintenance and repair of the power generation units 4 are performed in the ship. Therefore, the operational efficiency of such maintenance and repair in the narrow auxiliary machinery room or space 3 is low and the time and labor required for this operation are increased.

Further, since the power generation units 4 are small in number, if one of the units 4 is broken down, the output power thereof is remarkably reduced and there is a possibility that operation and service of the ship become difficult. Accordingly, since a person skilled in repairing trouble of the power generation units 4 is required as the crew of the ship, the crew is disadvantageously increased.

On the other hand, a conventional electrically propelled ship having a combination of a synchronous generator and a synchronous motor includes, for example as shown in a system diagram of FIG. 12, a single shaft propeller 21, a synchronous motor 24 coupled with the propeller 21 through a propeller blade pitch controller 22 and a propeller shaft 23 and two power generation units 70 connected to the synchronous motor 24 through a circuit breaker 25 and a bus 61. The electric power produced from the two synchronous generators 62 is monitored (66) by a load share controller 68 to control (69) governors 64 and control (67) the number of the units if necessary so that underload or overload is not applied to engines 65 such as an internal combustion engine to share load uniformly. Numeral 64 denotes a shaft of each generator.

Thus, in such an electrically propelled ship, in order to attain improvement of the reliability thereof, reduction of the maintenance in the ship, standardization of the plant and prevention of vibration, the provision of a multiplicity of small power generation units has been considered so that the reliability is improved by redundancy of the engines. That is, the provision of a multiple power generation unit allows repair of an engine failed during a voyage in an anchorage place so that the maintenance in the ship on the voyage can be eliminated. Further, the power generation units of the same type are provided to produce a desired output power, thereby attaining standardization of the plant. The small engines do not produce large unbalanced movement and vibration as compared with large engines and accordingly countermeasures or structures for preventing vibration are simplified.

However, the conventional mechanism which monitors the output of the power generation units to share the loads uniformly so that the underload or overload is not applied to the engine and the governors are adjusted in accordance with increase of the load and the generation units is difficult in control and complicated which therefore reduces the reliability of the system if the number of power generation units is increased.

Further, heretofore, in a power generation system provided with a plurality of generators which are operated in parallel to supply power to a load, when the load share control for the generators is performed, the load shared to each of the generators is determined by dividing the total power consumed in the load in accordance with the ratio of a rated output power of each generator to the sum of a rated output power of the total generators in the parallel operation. Accordingly, when the number of the generators is fifty, the load share control for the fifty generators is collectively performed.

FIG. 13 schematically illustrates an actual load share control for the generators in such a system in a prior art. Namely, in FIG. 13, power supplied to a power bus 45 from each of the generators Gx when circuit breakers 43 for the generators are closed is detected and the sum total (LMW) of power produced from the generators Gx is calculated. The sum total of power is shared to each of the generators Gx in accordance with the manner shown by equation (1). Numeral 44 denotes an interrupter for the motor. In this case, the load share control for n generators represented by $G_1-G_n$ is collectively performed by a microcomputer and accordingly the control has a limitation as a matter of course.

$$KVA_K = \left\{ a_K \cdot KW_K / \left( \sum_{i=1}^{n} a_i \cdot KWi \right) \right\} \times LMW \quad (1)$$

As described above, when the load share control for the generators in the prior art is performed for 50 generators collectively if the number of the generators is, for example, 50, and accordingly a very large scale control system is required. Further, when a microcomputer is used for the load since control, the microcomputer requires a large number of I/O ports and very large memory capacity. Additionally, the cycle time of the microcomputer must be long and the control thereof is therefore delayed.

OBJECT AND SUMMARY OF THE INVENTION

Accordingly, in view of the above problems, it is an object of the present invention to provide a power generation cassette type power plant for marine electric propulsion having power generation units which are formed in a container type to be made small so that transportation, installation and carrying-out of the power generation units are easily facilitated and space in a ship can be utilized effectively.

It is another object of the present invention to provide a load share controller for power generators in a power generation cassette type power plant for marine electric propulsion in which there are provided many power generation units having relatively low output power and the number of operating units of the many power generation units can be controlled with a small number of monitoring points easily and exactly with high reliability.

It is still another object of the present invention to provide a load share controller for power generators in a power generation cassette, type power plant for marine electric propulsion which is not large in scale and can perform load share control with high reliability without delay of control.

In order to achieve the above objects, the present invention is structured as follows. (1) The power generation cassette type power plant for marine electric propulsion is characterized by the provision of a multiplicity of power generation units each being formed as a power generation cassette including a power generator, a prime mover, for example such as an internal combustion engine for driving the power generator and a support structure for supporting the power generator and the engine internally, the support structure being formed in the same shape as that of a container for transporting cargo.

In the power generation cassette type power plant for marine electric propulsion, the support structure having the same shape as the cargo transportation container is transported, installed and carried out in the same manner as the cargo transportation container. Only a necessary number of power generation cassettes are installed properly depending on operation circumstances of the ship and the whole power generation cassettes produce the necessary electric power.

According to the power generation cassette type power plant for marine electric propulsion, the power generation cassettes are simple in structure and can be transported, installed and carried out very easily so that the propulsion output of the ship can be adjusted unrestrictedly and space in the ship can be utilized effectively. Even if one of the power generation cassettes fails, it can be exchanged easily and can also be repaired outside of the ship, thereby reducing operation of the crew in the ship. Accordingly, reliability of the power plant for marine electric propulsion is improved and the number of crews required for operation of the ship is reduced.

(2) The load share controller for power generators in a power generation cassette type power plant for marine electric propulsion including a multiplicity of power generation units and in which the power generators of the power generation units are operated in parallel with each other is characterized by the provision of governors provided for prime movers, for example internal combustion engines of the power generation units and including mechanisms for controlling the upper limit of a load and means for monitoring the load of the plant to control the number of operating power generators so that surplus output power to the load of the maximum total output power of the multiple power generation units is less than output power of a single power generator.

With the above configuration, the present invention can provide the load share controller for power generators in the power plant for marine electric propulsion including a multiplicity of power generation units having small output power and in which the number of operating power generation units is controlled with a small number of monitoring points easily and exactly with high reliability so that reduction of maintenance in the ship and simplification of vibration preventing structure and countermeasure can be attained.

(3) The load share controller for power generators in a power generation cassette type power plant for marine electric propulsion including a multiplicity of power generation units and in which the power generators of the power generation units are operated in parallel with each other is characterized by the provision of an upper grade load share controller in which the power generators are divided into a plurality of groups each consisting of at least one power generator and each regarded as one large-capacity power generator and output power of said large-capacity power generator is determined from the sum total of rated output power of the individual power generators operating in the group and in which load shared to each of the large-capacity power generators of total power consumed in loads connected to the plant is determined from a ratio of output of the individual large-capacity power generator to the sum total of output of the large-capacity power generators, and a lower grade load share controller for determining the load, which is shared to each of said large-capacity power generators and determined by said upper grade load share controller, on the basis of a ratio of output of the individual power generators to the output of said large-capacity power generator consisting of the individual power generators in the group.

In the load share controller for power generators described above, load share control is attained by dividing the controllers into the lower controllers controlling power to the upper controllers such as the first stage controllers, the second stage controllers, the third stage controllers and so on. The controllers attain the load share control independently in accordance with the signal from the controller positioned at the upper side by one stage. Accordingly, the load share control of the power generators can be performed with high reliability.

The idea of the present invention is now described with reference to an example.

Description is now made by way of example to a case where the total number of the power generators is fifty and the number of power generators which can be controlled by a microcomputer is five. Thus, the fifty power generators are controlled by the combination of microcomputers as follows. Namely, the fifty generators are divided into ten groups each having five generators (first stage). The ten groups are further divided into two sections each having five groups (second stage). Finally, the two sections are combined into one (third stage). In this case, 13 microcomputers, that is, $(10+2+1)=13$ microcomputers are required. Namely, one microcomputer controls the two sections, two microcomputers control ten groups, and ten microcomputers control ten groups in response to signals supplied from the microcomputers in the upper stage, respectively. The microcomputers may be small size, the number of I/O for the individual microcomputer is reduced and the cycle time of the microcomputer is not long.

The present invention configures and controls the system by the combination of many microcomputers having relatively small capacity. That is, the lowermost stage microcomputers attain the load share control for any number of power generators by the signal supplied from the upper microcomputer disposed at the upper side thereof by one stage. The upper microcomputers attain the load share control for any number of the microcomputers disposed at the lower side thereof by one stage by the signal supplied from the microcomputer located above the upper microcomputer by one stage. Thus, the load share control is finally attained by the uppermost stage microcomputer. The uppermost stage microcomputer always detects the total consumption power to control the lower microcomputers disposed at the lower side by one stage and the lower microcomputers control the further lower microcomputers located thereunder by one stage, thereby the lowermost stage microcomputers attain the load share control finally.

According to the present invention, there can be provided the load share controller for the power generators which is not large scale and attains the load share control without delay of control with high reliability.

BRIEF DESCRIPTION OF THE DRAWINGS

FIGS. 1 to 3 illustrate an embodiment of the power generation cassette type power plant for marine electric propulsion according to the present invention; in which FIG. 1 is a side view thereof;

FIG. 2 is a plan view thereof; and

FIG. 3 is a side view showing a modification thereof;

FIG. 8 is a block diagram showing an embodiment of the load share controller for power generators of the power generation cassette type power plant for marine electric propulsion according to the present invention;

FIGS. 9 and 10 show examples of grouping of the power generators in the embodiment;

FIG. 13 illustrates a conventional load share control of the power generators.

DETAILED DESCRIPTION OF PREFERRED EMBODIMENTS

Figure 4:
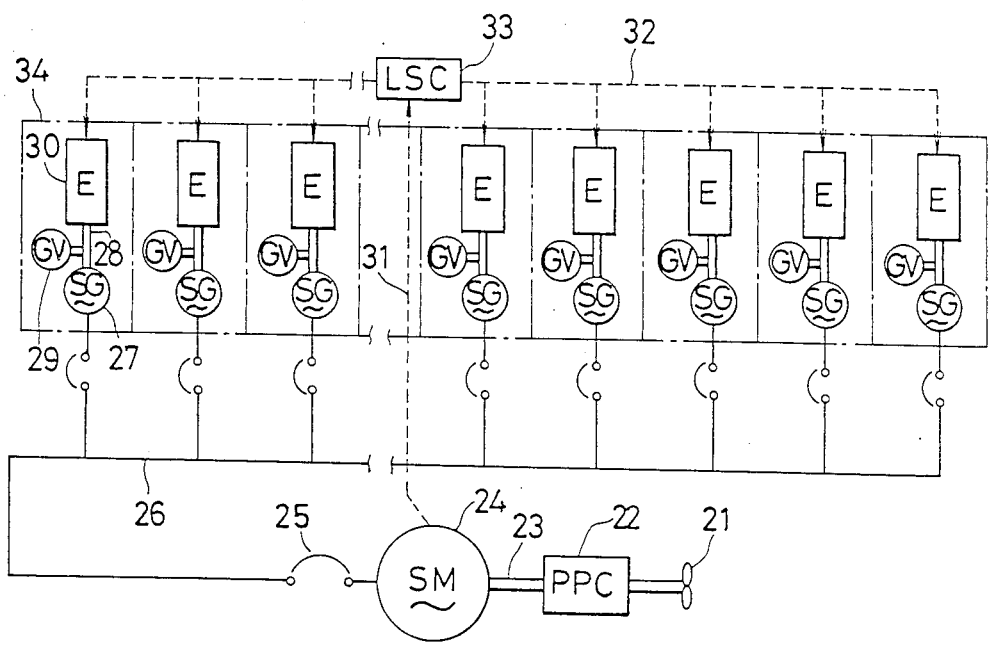
FIG. 4 is a system diagram showing an embodiment of the load share controller for power generators of the power generation cassette type power plant for marine electric propulsion.
Figure 11:
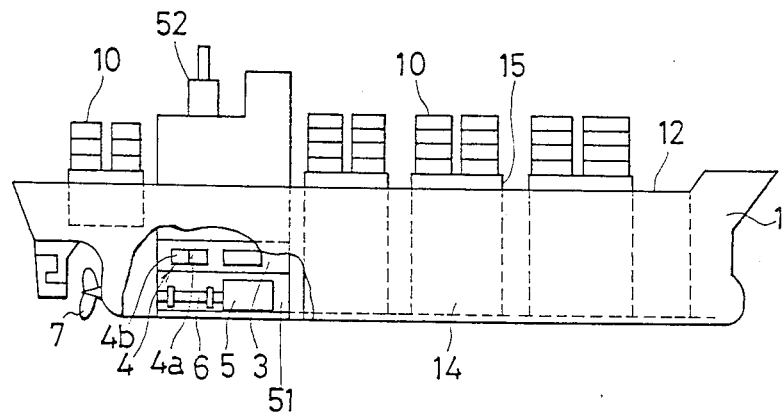
FIG. 11 is a side view showing a conventional power plant for marine electric propulsion.

A power generation cassette type power plant for marine electric propulsion according to an embodiment of the present invention is now described with reference to drawings, in which FIG. 1 is a side view thereof, FIG. 2 is a plan view thereof and FIG. 3 is a side view showing a modification thereof.

As shown in FIG. 1 and 2, a generator room 16 is provided on an upper deck 12 of a ship 1 and a multiplicity of power generation cassettes 11 forming power generation units are provided in the generator room 16.

The power generation cassette 11 comprises a power generator not shown, an engine not shown which drives the power generator and a support structure 11a which supports the power generator and the engine internally. The support structure 11a is formed into the same shape as that of a container 10 for transporting a cargo. The container 10 may be of a flat rack type or an enclosed type. The support structure 11a can be treated in the same manner as the container 10.

The power generation cassettes 11 are disposed in two columns on the upper deck 12 in the transverse direction of the ship and are stacked two by two for each column vertically. Thus, many power generation cassettes 11 are provided on the ship. If more power generation cassettes 11 are required, the power generation cassettes 11 may be provided in a container holder 14 or may be stacked on a hatch cover 15 in the same manner as the containers are stacked therein.

The power generation cassette 11 includes pipes for fuel for the engine, cooling water and suction and exhaust of air and conductors for power supply, and the pipes and the conductors are easily detachable from the cassette 11. Further, there are many connection devices, not shown, which are provided at the side of the ship 1 and connected to the pipes and conductors detachably. The connection devices are connected to necessary facilities such as a fuel supply system, a cooling water supply system, an air suction and exhaust system not shown and a power distributing board 13. The pipes and conductors are connected to the connection devices, not shown, of the power generation cassettes 11 and the side of the ship 1 upon installation of the power generation cassettes 11.

Electric power produced from the power generation cassettes 11 is supplied to a main drive motor 5 through the power distributing board 13 in an engine room 2 by conductors not shown. Rotary power of the main drive motor 5 is transmitted through a propeller shaft 6 to a propeller 7.

In the drawings, numeral 8 denotes a living area, and numeral 9 denotes a funnel and an exhaust pipe for exhaust gas.

Since the power generation cassette type power plant for marine electric propulsion according to one embodiment of the present invention is structured above, the power generation cassettes 11 can be treated in the same manner as the cargo container 10. Accordingly, any special cargo-handling machine and tool are not required for loading and installation of the power generation cassette 11 on the ship, housing and fixing and further carrying out of the cassettes, and an ordinary cargo-handling machine provided in a container yard can be employed as it is. Further, a machine for transporting the cargo container can be used for transportation of the cassettes as it is.

Accordingly, the power generation cassettes 11 can be easily installed by anyone in the same manner as the cargo container 10.

Further, the power generation cassettes 11 and the cargo container 10 can be treated similarly and accordingly it is not necessary to provide the space dedicated to the cassettes largely. When large output power is required for propulsion of the ship, the cassettes may be installed in a hangar for the cargo containers or may be loaded on the ship. On the contrary, when small output power is sufficient for propulsion of the ship depending on the voyage condition, the number of the power generation cassettes 11 loaded in the ship is reduced and the ordinary cargo containers 10 can be loaded in the space for the cassettes 11 of the generation room 16 formed by reducing the cassettes. Thus, the propulsive force of the ship can be adjusted and the space in the ship can be utilized effectively.

Furthermore, since there are provided many power generation cassettes 11 having small output power, it is very rarely the case that the ship cannot be operated even if one power generation cassette 11 fails, and the reliability of the plant is improved. Accordingly, a person for maintaining and repairing the generation cassettes 11 in the ship is not required and it is useful to reduce the crew required for operation of the ship.

When a self-cooling radiator is provided for the generation cassettes 11, a conventional cooling system using seawater can be eliminated and the installation of the cassettes can be simplified.

The number of the power generation cassettes 11 loaded in the ship 1 is determined so that when the output power of the single generation cassette is 600 kw and the total output power of the power generator required in the ship is 24000 kw, 40 generation cassettes are equipped. The engine of the generation cassette 11 may utilize a gas turbine or any other prime movers in place of internal combustion engines.

FIG. 3 shows a modification of the embodiment in which four power generation cassettes 11 are stacked and aligned in a line in the traveling direction of the ship so that the number of cargo loaded in the ship can be increased. Accordingly, the space in the ship can be utilized effectively.

If the generation cassettes 11 are installed in the space on the ship that is not watertight, the cassettes 11 are required to be waterproof, while if the cassettes 11 are waterproof, the generation room 16 in the ship may be removed entirely.

As a modification of the embodiment, if the generation cassettes 11 are placed in a plane without pile, the generation room 16 may be disposed under the upper deck 12 or the living area 8 may be disposed adjacent to the generation room 16.

The shape, dimension and weight of the generation cassette 11 need not be identical with those of the cargo container. Further, the generation cassette 11 need not be sealed necessarily.

Figure 5:
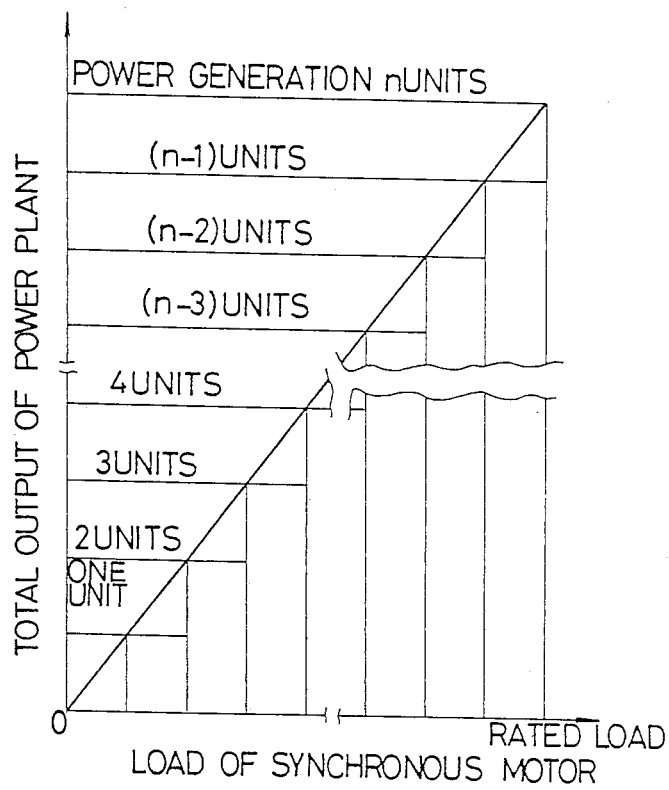
FIG. 5 is a diagram showing a relation between the load of the power generator and the total output of the plurality of power generation units in FIG. 4.
Figure 6:
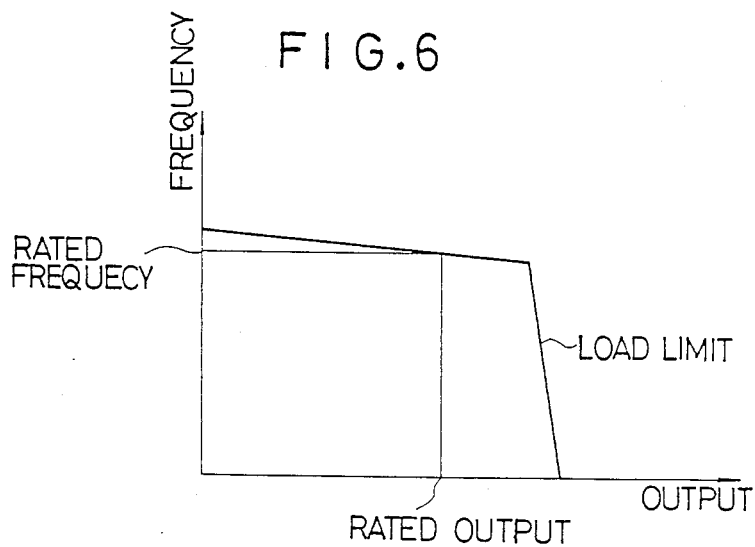
FIG. 6 is a drooping characteristic diagram of a governor of the power generation unit in FIG. 4.
Figure 7:
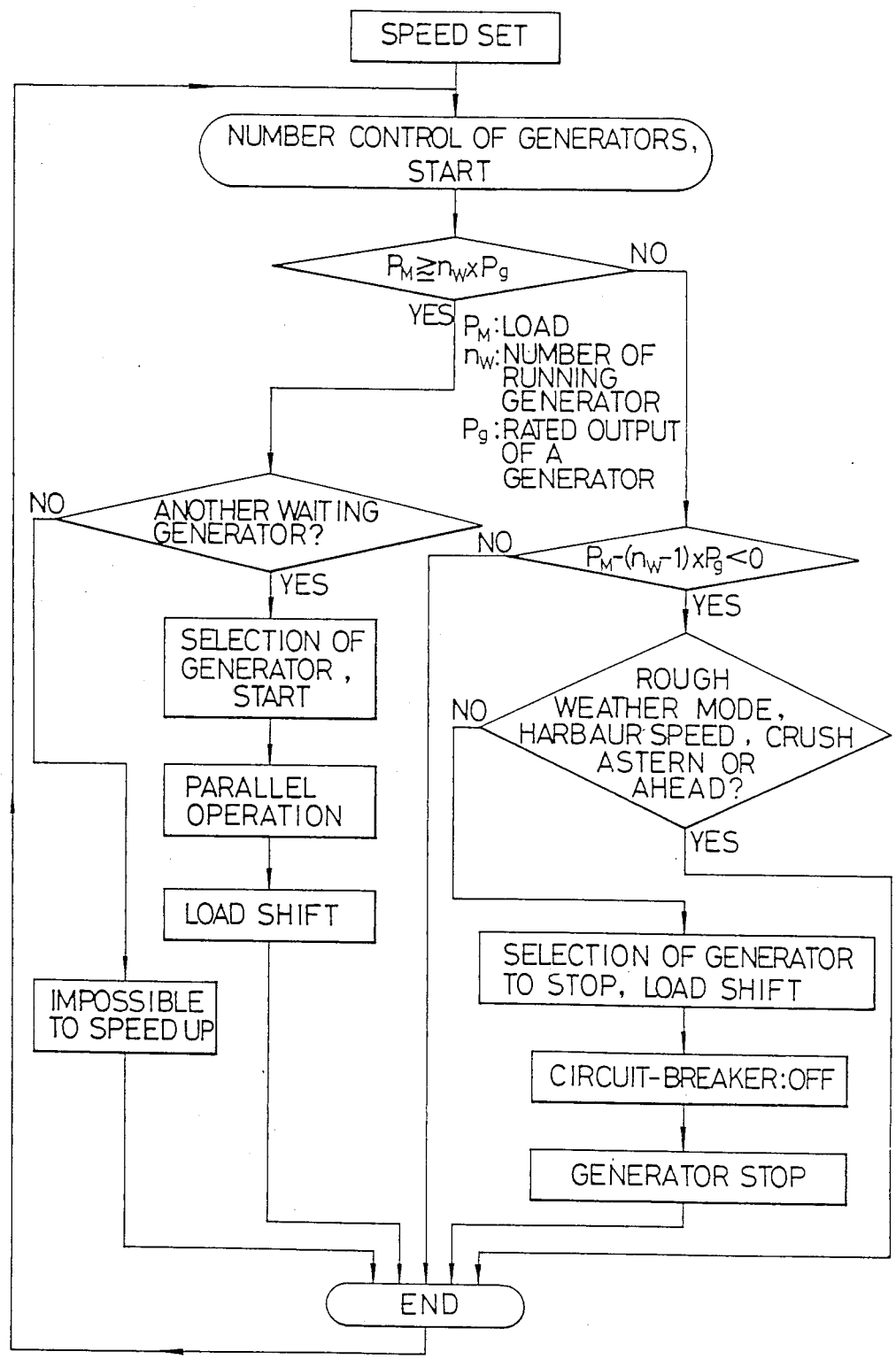
FIG. 7 is a flowchart of the control system of FIG. 4.

An embodiment of the load share controller for power generators of the power generation cassette type power plant for marine electric propulsion according to the present invention is now described with reference to drawings. FIG. 4 is a system diagram thereof. FIG. 5 shows a relation of the load of the power generators and the total output power of a plurality of power generation units in FIG. 4, FIG. 6 is a dropping characteristic diagram of a governor of the generation unit in FIG. 4 and FIG. 7 is a flowchart of a control system in FIG. 4.

Referring to FIG. 4, a multiplicity of generation units 34 each comprising a synchronous generator 27 having small output, a governor 29 and an engine 30 generate a.c. power which is consumed by a propeller 21 and a synchronous motor 24 to produce the propulsive force of an electrical propulsion type ship. The synchronous motor 24 is rotated in synchronism with the frequency on a bus 26 and the propulsive force is controlled by a propeller blade pitch controller 22 to vary the load of the motor.

Each of the governors 29 is adjusted to exhibit a fixed drooping characteristic by a speed in accordance with a rated output of the generation unit 34 and has a mechanism of controlling the upper limit of the load such as a rack limiter to eliminate a difference in a ratio of the output of the generation unit to the rated output. Numeral 23 denotes a propeller shaft, 25 a circuit breaker and 28 a shaft of the generator.

The control system for variation of the speed of the ship is now described with reference to the flowchart of FIG. 7. When the ship is accelerated, the propeller blade pitch is increased to enhance the propulsive force and the load is increased. Accordingly, the number of the generation units is controlled (32) to increase the number of the operating units 34. The load is always monitored (31) to reduce the surplus output to the load of the maximum total output to the output of one generation unit or less so that there is no idling generation unit.

Figure 12:
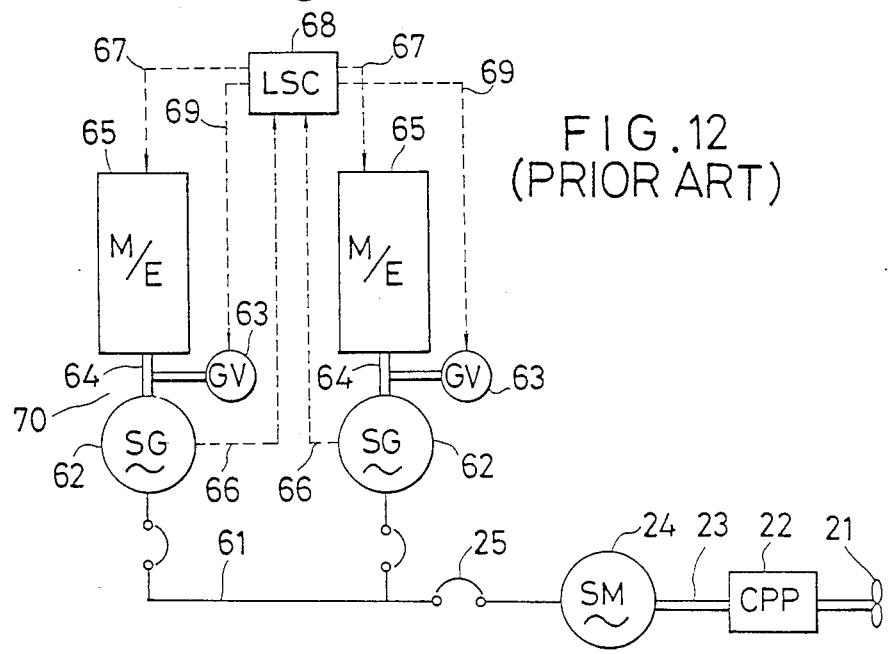
FIG. 12 is a system diagram of a conventional load share controller for power generators of the power plant.

The conventional manner as shown in FIG. 12 is not employed in which the outputs of the power generators 62 are monitored (66) to uniformly vary (69) the setting value of each governor 63 so that the outputs of the power generation units 70 are uniform and the load of the engine is uniform. On the contrary, as shown in FIG. 6, the load share control is made by the governor 29 having the drooping characteristic set in accordance with the outputs of the power generation units 34. Accordingly, even if the load sharing is scattered or varied slightly due to scattering on the manufacture of the governors 29 and the engines 30, the maximum outputs of the generation units are limited by the rack limiter which limits the maximum load. Even if other generation units except one unit are operated with the maximum output, since the surplus output to the load of the maximum total output is less than the output of one unit, there is no idling unit.

In the normal operation, the load of the motor is monitored (31) and the number of the generation units is controlled (32) by a load share controller 33 so that the surplus output to the load of the total output of the generation units 34 is less than the output of the one generation unit.

When the ship is decelerated, the propeller-blade pitch is reduced to decrease the propulsive force so that the load to the motor 24 is reduced. The number of the generation units 34 is controlled correspondingly to reduce the number of the operating units. In the same manner as in the acceleration, the surplus output in the load of the total output of the generation units 24 is reduced less than the output of one generation unit so that there is no idling generation unit. In this case, the load share controller 33 montiors (31) the load to the motor so that the number of the generation units is controlled (32) in accordance with the surplus output of the maximum total output of the generation units 34.

Figure 9:
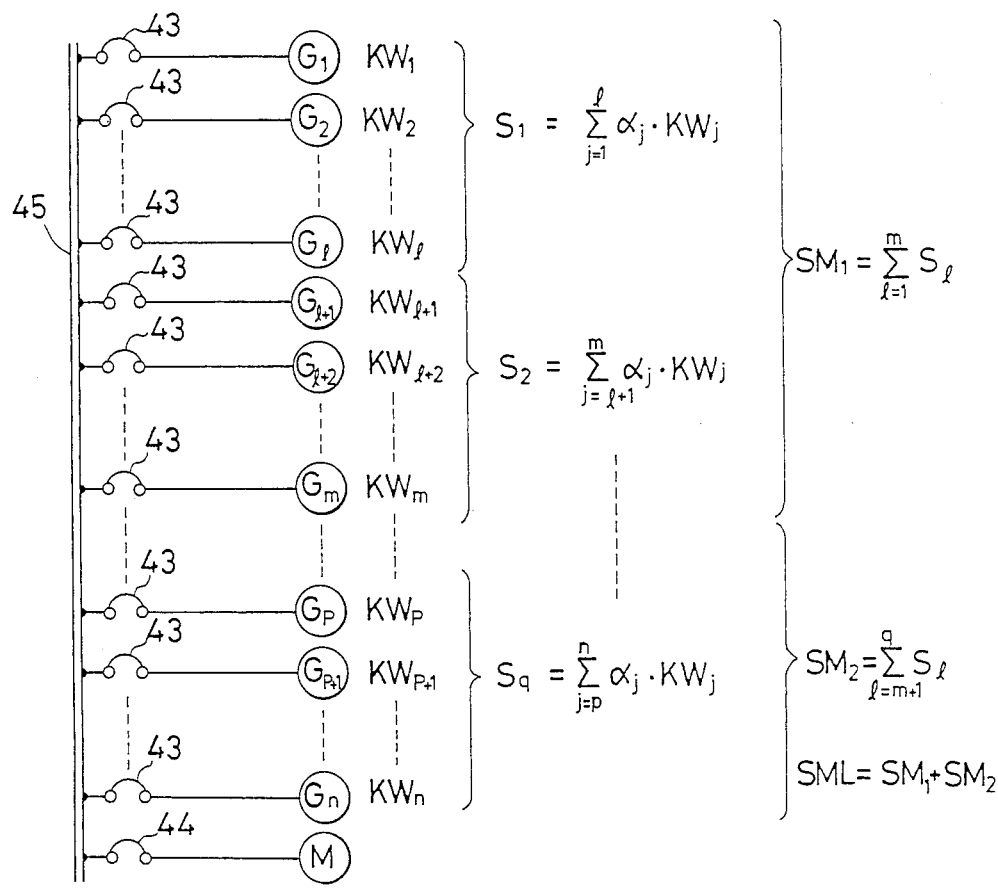

Referring to FIGS. 8 to 10, an embodiment of the load share controller for power generators in the power generation cassette type power plant for marine electric propulsion according to the present invention is now described.

In FIG. 9, power generators are divided into q groups: $G_1 \sim G_{l+1} \sim G_m, \ldots, G_p \sim G_n$. The total power produced by each of the groups is calculated as $S_1, S_2, \ldots, S_q$ on the basis of the equations (2), (3) and (4), respectively. That is, the $S_1, S_2, \ldots, S_q$ are calculated from the groups of generators ($\alpha x = 1$) which supply power actually. The total power of each of groups ($SMx$) consisting of $Sx$ groups is calculated by the following equations (5) and (6). Thus, the sum total ($SML$) of the electric power produced by the power generation system is calculated by addition of $SMx$ in accordance with the following equation (7) in the example of FIG. 9. That is, the sum total of the system is calculated by obtaining the sums $KWx$, $Sx$, $SMx$ and $SML$ successively.

$$S_1 = \sum_{j=1}^{l} a_j \cdot KW_j \tag{2}$$

$$S_2 = \sum_{j=l+1}^{m} a_j \cdot KW_j \tag{3}$$

$$S_q = \sum_{j=P}^{n} a_j \cdot KW_j \tag{4}$$

$$SM_1 = \sum_{l=1}^{m} Sl \tag{5}$$

$$SM_2 = \sum_{l=m+1}^{q} Sl \tag{6}$$

$$SML = SM_1 + SM_2 \tag{7}$$

FIG. 8 is a block diagram showing a configuration of the load share controller for embodying the above operation.

In FIG. 8, signals $iKWx$ corresponding to the rated outputs of the respective generators are supplied to lower-grade load share controllers 41 and signals $\alpha x$ are also supplied to the lower-grade load share controller 41. The sum products of these signals are calculated as $iSx$ in the lower grade load share controllers 41 in accordance with the equations (2), (3) and (4) and supplied to the inside of the controllers 41 and to upper-grade load share controllers 42. The sums $iSx$ supplied to the upper-grade load share controllers 42 from the lower-grade load share controllers 41 are calculated and integrated (sum) in the upper-grade load share controller 42 in accordance with the equations (5) and (6). The results are supplied as $iSMx$ to the inside of the upper-grade load share controller 42 and an uppermost load share controller 46. The results $iSMx$ supplied to the uppermost controller 46 from the upper controllers 42 are integrated (sum) in the uppermost controller 46 in accordance with the equation (7) and the integrated result is supplied as $iSML$ to the inside of the uppermost controller 46. When the operation condition (generation of power of stoppage of power) of the generators is varied, the $iSx$ is necessarily changed and accordingly the $iSMx$ and $iSML$ are also changed so that the latest operation condition of the generators is always detected.

The latest value of the total power consumed in the load can then be detected by $iLMW$ supplied to the uppermost controller 46. In this case, the load to be shared to each of the controllers 42 is calculated in the controller 46 in accordance with the equation (10) described below on the basis of the ratio of the $iSMx$ supplied by the controller 52 and the $iSML$ calculated in the controller 46. The signal corresponding to the $iLMs$, that is, the signal corresponding to the load to be shared to the controllers 42 as shown in the following equation (11) is supplied to the controller 42 from the controller 46. This signal is named $iLMk$.

The controlling 42 calculate the load to be shared to the controllers 41 in accordance with the equation (9) on the basis of the ratio of the $iSx$ supplied from the controllers 41 and the $iSM$; calculated in the inside of the controller 42. The signal corresponding to $iLx$, that is, the signal corresponding to the load to be shared to the controllers 41 shown by the following equation (12) is supplied to the controllers 41 from the controller 42. The signal is named $iLj$. Finally, the controllers 41 calculate the load to be shared to the generators in accordance with the equation (8) on the basis of the ratio of the input signal $iKWt.\alpha t$ associated with the generators and the $iSj$ calculated in the inside of the controller 41.

As described above, the load to be shared to the generators finally and the signal value shown by the following equation (13) corresponding to the load are determined and accordingly the load share control is attained in accordance with the signal value. On the other hand, when the $iLMW$ is chanted, the signals $iLMW$, $iLMx$, $iLx$ and $iKVAx$ are also changed successively in the order of the description of the signals and accordingly the load to be shared to the generators is also changed.

FIG. 10 shows one group of the divided generators which coincides with any one of the groups divided into $G_1 - G_l, G_{l+1} \sim G_m, \ldots, G_p \sim G_n$ of FIG. 9. Numeral 43 denotes an interrupter for the generator, 44 an interrupter for the motor, and 45 a bus. In the example of FIG. 10, one group consists of $(r - R + 1)$ generators from the R-th to the r-th generators. The sum total of the load to be shared to the generators in this group is $Lj$ and the load to be shared to each of the generators is calculated in the equation (8).

$$KVA_t = \frac{\alpha_t \cdot KW_t}{\sum_{i=1}^{r} \alpha i \cdot KW_i} \cdot Lj = \frac{\alpha_t \cdot KW_t}{Sj} \cdot Lj \tag{8}$$

$$Lj = \frac{Sj}{SMl} \cdot LM_K \tag{9}$$

$$LM_K = \frac{SM_K}{\sum_{l=1}^{2} SMl} \cdot LMW = \frac{SM_K}{SML} \cdot LMW \tag{10}$$

$$iLMx = (iSMx/iSML) \cdot iLMW \tag{11}$$

$$iLx = (iSx/iSMl) \cdot iLMk \tag{12}$$

$$iKVAx = \{(iKWt \cdot \alpha_t)/iSj\} \cdot iLj \tag{13}$$

As described above, the load share controller for the generators having the embodiment configuration attains the following effects.

(a) The load share control is attained dividedly by the controllers divided into the lower controllers to the upper controllers such as the first stage controllers, the second stage controllers, the third stage controllers and so on. The controllers attain the load share control independently in accordance with the signal from the controller positioned at the upper side by one stage. Thus, the load share control is attained by the combination of small scale microcomputers without need of large scale microcomputer and accordingly the deficiency due to delay of control in the prior art can be removed completely.

(b) Even if any one or more of the lowermost controllers fail, the load share control can be attained by the remaining controllers. Accordingly, the reliability of the system is improved by decentralization of the small controllers as compared with the prior art. Utilization of microcomputers having the same performance improves the reliability by interchangeability thereof.

The present invention is not limited to the above embodiments and can be implemented even with the following modification.

(a) The load share control according to the present invention can be attained with controllers structured in three or more stages. That is, it is considered that the generators are divided into some groups (first stage), the groups are further divided into some sets (second stage), the sets are divided into some sections (third stage) and if necessary the sections are further divided to form a fourth stage, fifth stage and so on.

(b) While the embodiments are described with respect to the proportional load distribution control, they can also be applied to a current load distribution control in the same manner.

Various modifications can be made to the present invention without changing the gist of the present invention.

We claim:

1. A load share controller for power generators in a power generation cassette type power plane for marine electric propulsion including a multiplicity of power generation units and in which the power generators of the power generation units are operated in parallel with each other comprising:
    an upper grade load share controller dividing the control of the power generators into a plurality of groups each consisting of at least one power generator and each regarded as one large-capacity power generator, the output power of said large-capacity power generator being determined from the sum total of rated output power of the individual power generators operating in the group and in which load shared to each of the large-capacity power generators of total power consumed in loads connected to the plant is determined from a ratio of output of the individual large-capacity power generator to the sum total of output of the large-capacity power generators, and
    a lower grade load share controller for determining the load, which is shared to each of said large-capacity power generators and determined by said upper grade load share controller, on the basis of a ratio of output of the individual power generators to the output of said large-capacity power generator consisting of the individual power generators in the group.

2. A power generation cassette type power plant for marine electric propulsion comprising:
    a multiplicity of power generation units each formed as a power generation cassette including,
    a power generator,
    a prime mover for driving said power generator, and
    a support structure for supporting said power generator and said prime mover, said support structure being formed in the same shape as that of a container for transporting cargo; and
    a governor provided for the prime mover of each said power generation unit to control the upper limit of the load thereof; and
    a load share controller for controlling said power generation units to operate in parallel with each other, said load share controller monitoring the total load of said power plant to selectively enable and disable operation of individual power generation units so that surplus output power generated by said plant is less than the output power generated by a single said power generation unit.

3. The power plant of claim 2 wherein said load share controller includes
    at least one upper level controller dividing said power generation units into at least two power generation groups and controlling the generation of power therebetween, and
    a plurality of lower level controllers, each associated with one of said power generation groups for controlling the generation of power between subgroups each including one or more power generation units.

4. The power plant of claim 3 wherein each of said at least one upper level controller and said lower level controllers comprising a microprocessor control.

5. The power plant of claim 4 wherein said microprocessor control shave the same performance.

6. A method of controlling power in a power generator cassette type power plant for marine electric propulsion having a multiplicity of power generation units each including a power generator and a prime mover, comprising:
    governing the upper limit of load seen by each said power generation unit;
    controlling said power generating units to generate in parallel by,
    monitoring the load of said power plant, and
    selectively enabling and disabling operation of individual said power generation units so that the surplus output of said plant is less than the output generated by a single said power generation unit.

* * * * *